Dec. 5, 1939.  W. M. VENABLE  2,182,684

GAS GENERATOR

Filed Jan. 13, 1939

INVENTOR
William Mayo Venable by his attorneys
Stebbins, Blenko & Parmelee

Patented Dec. 5, 1939

2,182,684

UNITED STATES PATENT OFFICE 2,182,684

GAS GENERATOR

William Mayo Venable, Pittsburgh, Pa., assignor to Blaw-Knox Company, Blawnox, Pa., a corporation of New Jersey Application January 13, 1939, Serial No. 250,697

12 Claims. (Cl. 62—1)

This invention relates to a system for supplying gas such as fuel gas by vaporization of a volatile hydrocarbon liquid in a tank buried in the earth.

In supplying fuel gas to isolated consumers, small communities, or industrial works, the use of buried tanks containing a volatile hydrocarbon liquid which vaporizes at low temperatures has become quite common.

Where buried tanks are employed it is customary to utilize heat derived from the earth to vaporize the liquid within the tank. The capacity of a tank for using ground heat for vaporization depends upon the readiness with which ground heat may be conducted through the ground and tank walls to the liquid, that is, the heat conductivity of the system, and upon the ground temperature. The ground temperature depends upon the season, being materially lower during winter than during summer, and upon the amount of heat abstracted from the ground by the evaporator. The conductivity depends upon various factors, one of which is the area of contact of the liquid with the tank wall.

The advantage of keeping as large as possible a tank surface in contact with the liquid has been pointed out by Roy M. Mead in his applications, Ser. Nos. 194,180 and 198,720, co-pending herewith.

One object of this invention is to maintain the contact area of liquid with tank wall substantially constant, or within narrowly defined limits, regardless of depletion of liquid within the tank because of gas consumption or of decrease in ground temperature, in order that conductivity of heat from the surrounding earth, through the tank wall to the liquid may be a maximum consistent with actual ground temperature. This object constitutes the first phase of the invention.

The second object is to supply from a source other than the earth enough heat in excess of what can be derived from the surrounding earth, to maintain evaporation as required by gas consumption, but only for such periods as the earth heat supply is inadequate.

The apparatus by which I accomplish the foregoing objects will be described in detail with reference to the accompanying drawing in which.

Figure 1:
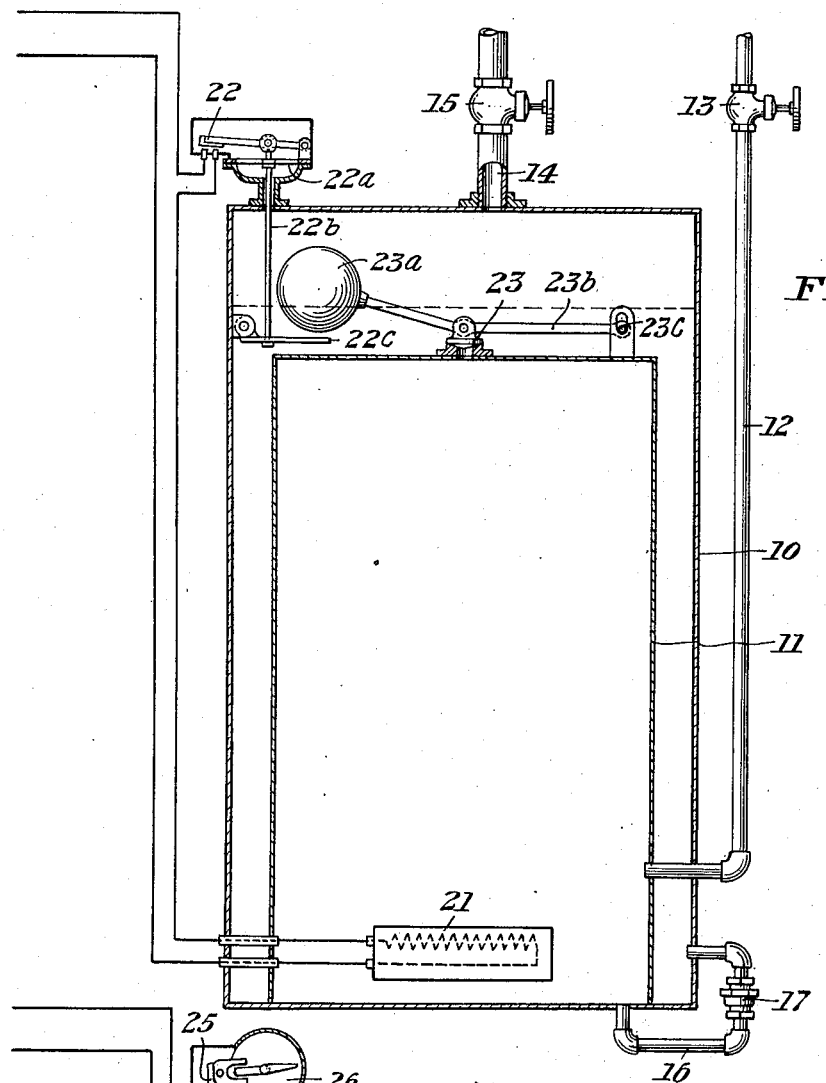
Figure 2:
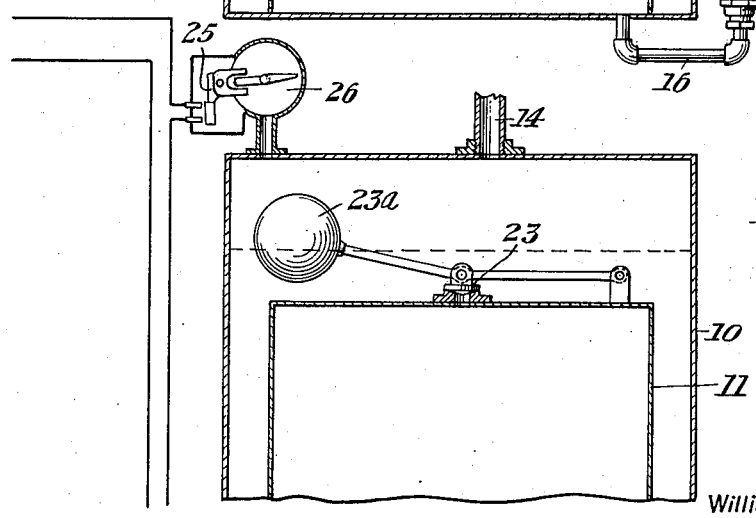

Fig. 1 is a view partly in section and partly diagrammatic, illustrating one form of the invention; and Fig. 2 is a similar view of a modification.

Referring now in detail to the drawing, and for the present to Fig. 1, an evaporating chamber or tank 10 of any suitable construction contains a storage compartment or reservoir 11. The evaporator and reservoir may conveniently be in the form of cylindrical tanks disposed coaxially and having a common bottom, providing an annular space between the two. The reservoir 11 may be of lighter construction than the evaporator 10 since it is subject only to relatively low pressures. For convenience only I have indicated coaxial cylindrical tanks with their axes vertical. Small tanks may be placed thus. It is more convenient to arrange large tanks with their axes horizontal. The invention is in no way dependent upon the shape, or position of the tanks.

An inlet pipe 12 having a shut-off valve 13 therein communicates with the interior of the reservoir 11. A gas offtake 14 having a main control valve 15 therein communicates with the top of the evaporator 10. A connection 16 extends from the reservoir 11 to the space between it and the wall of the evaporator 10. A check valve 17 in the connection 16 permits liquid to flow from the reservoir into the evaporator but not in the reverse direction.

The top of the inner tank, or reservoir 11, is closed except for a relief valve 23, normally closed, but provided with a float 23ª to open it when the liquid level between inner and outer tanks reaches a predetermined level.

With the apparatus as thus far described, and no further appurtenances, the operation would be as follows: assuming that both tanks were filled to a common level, below the top of the inner tank, all valves being closed, and the liquid within the tank has acquired a temperature uniform with that of the surrounding earth, the gas pressure above the liquid level in both tanks being the same, opening of valve 15 permits immediate withdrawal of gas and consequent lowering of pressure in the space between the tanks, but not of the gas in the inner tank. The resulting pressure difference will cause liquid to flow from the inner tank, through the check valve 17, to the space between the tanks. When the pressure difference is sufficient such flow will continue until the liquid level between the two tanks raises the float 23ª and opens the relief valve 23. This permits escape of gas from the inner tank, whereupon the liquid level between the tanks ceases to rise; but the liquid cannot flow back into the inner tank because of the check valve 17.

With this arrangement it is of no importance whether liquid to replenish gas drawn off be evaporated from within the inner tank, escaping through the relief valve 23 if the liquid between the tanks be high, or from the space between the tanks if the relief valve be closed. The important thing is that the passage of heat from the earth to the liquid is facilitated by keeping the space between the tanks full.

I make no claim to invention as to any of the features thus far described. My invention relates to the addition of other features now to be described.

In actual practice the consumption of gas usually is intermittent, or at least fluctuating. When the withdrawal of gas ceases, all parts of the apparatus and the surrounding earth gradually acquire the same temperature; and when withdrawal of gas again occurs the condition just described is re-established.

But if the withdrawal of gas is continuous and long protracted, there is a gradual lowering of temperature of the entire apparatus and the liquid within it, and a consequent lowering of gas pressures. The higher level of liquid in the space between the tanks can be maintained continuously only by maintaining a somewhat higher temperature in the reservoir than in the outer tank; or the level in the space between the tanks, if lowered by evaporation, can be raised only by warming the liquid in the inner tank. By having a check valve, this restoration can be made intermittent, but if the check valve is omitted, a temperature difference would be required all the time.

To accomplish this warming of the reservoir liquid, a heater 21 of any suitable type is disposed within the reservoir 11. While I have illustrated the heater as being of the electric resistance type, it will be apparent that other forms of heaters may also be used. The heater 21 is controlled by a switch 22, which is closed by the mechanical action of the float 23ª when the liquid level between the tanks reaches a certain minimum. When the float is raised by the inflow of liquid, the switch is opened. For convenience I have shown the switch 22 above the tank, actuated mechanically through a diaphragm 22ª to prevent the escape of gas, by a link 22ᵇ and a lever 22ᶜ. This showing is selected wholly as a matter of convenience, and not as a preferred construction. Any other type of switch might be used, and the switch may be placed either within or without the gas chamber, as may be desired.

To render the operation of the switch independent of the relief valve the float is allowed a certain amplitude of movement between the position where it closes the switch and that where it opens the relief valve. Any convenient means for such movement may be provided. I have shown as a suitable means slotting the hole for the pivot as at 23ᶜ, so as to permit the end of the lever 23ᵇ opposite to the float 23ª a limited motion.

With the device as thus described, the weight of parts holding the valve 23 shut is made such as to prevent escape of gas from the inner tank 11 at all times except for short intervals when the float 23ª raises the valve 23. Normally evaporation takes place only in the space between the tanks, and ground heat only is used for evaporation. If the withdrawal of gas is continuous, the level of liquid between the tanks gradually falls until the lowering float 23ª causes closing of the switch 22 by engaging lever 22ᶜ, whereupon heat is supplied to the inner tank 11, raising the temperature and pressure therein, and causing liquid to pass therefrom through the check valve 17, thus restoring the level of liquid in the evaporation chamber 10. This heat supply will continue until raising of the float 23ª permits opening of the switch 22 and interruption of the heat supply. Of course, with any means of applying heat, an appreciable time is required for the heat to flow from the heater, whatever type that may be, to the liquid. Therefore, the pressure of gas within the inner tank 11 may continue to increase for a short period and the level of the liquid between the tanks to rise for a short period after the heat supply is interrupted by the opening of the switch 22. Should it rise high enough it will raise the float 23ª high enough to permit some gas to escape through the valve 23; but this escape will be of short duration, as no additional heat will be supplied to the heater when the liquid level between the tanks is high enough to keep the switch 22 open.

Obviously, two floats may be used, one to operate the switch and one to operate the relief valve. The two functions are independent of one another.

In the arrangement shown in Fig. 2, a switch 25 turning on and off the artificial heat is actuated by a pressure responsive device 26 in such a manner that when the pressure in the space between the tanks reaches a minimum below which desired gas pressure in the service system cannot be maintained, the switch 25 will be closed, and remain closed until, by heat supplied from within, the pressure attains an established maximum. When heat is turned on, the first effect is to warm the liquid in the inner tank and consequently fill the space between the tanks, and to keep that space full, as in the case described with reference to Fig. 1. When the pressure reaches the maximum, the artificial heat supply is cut off by the switch 25. If, then, the ground temperature is such as to supply sufficient gas evaporation to maintain the minimum required pressure, no further evaporation will occur in the inner tank. When, however, evaporation by ground heat is inadequate to maintain the minimum pressure, regardless of level between the tanks, the artificial heat will again be turned on. If the ground heat supply is inadequate, the artificial heat will be turned on and off alternately, maintaining the pressure between assigned limits, the relief valve 23 being open sufficiently to supply from the inner tank only enough gas evaporated by artificial heat to make up the deficiency which ground heat is insufficient to supply.

As there is a natural relationship between the temperature and the pressure of a gas in equilibrium with its condensate, it is obvious that a suitable thermometer or thermostat may be substituted for the pressure responsive device in Fig. 2. It is obvious that with the heat supply being controlled by pressure gage or thermostat as just described and as illustrated in Fig. 2, the check valve 17 may be omitted. A hole in the tank wall 11, near to its bottom, can then replace the parts 16 and 17 shown in Fig. 1.

It is also obvious that if, due to excessive cooling of the gas between the container and the reservoir occasioned by rapid evaporation and insufficient supply of ground heat, or by excessive artificial heating within the reservoir, the pressure difference becomes excessive, liquid will pass from the reservoir to the container until the relief valve is opened.

Instruments for opening and closing electrical circuits, actuated by various mechanical means, temperature and pressure gages and detectors of various kinds, adaptable to purposes such as indicated in the foregoing description, and means for operating other devices by currents so established, either directly or through relays, are available as standard articles of commerce, in numerous forms. It is the intention to make use of such devices, in their perfected forms, and not to claim any of them per se. For this reason the showing in the figures is purposely diagrammatic.

The system permits advantage to be taken of the amount of heat available at different seasons of the year. During the summer, for example, the heat absorbed from the earth may be sufficient to maintain the desired evaporation regardless of liquid level within the tanks. No artificial heat will be needed or supplied. During spring and fall artificial heat will be supplied only to maintain the large contact area of liquid with tank wall. During the coldest weather only, the deficiency in ground heat will be supplied artificially but automatically, in amounts only sufficient to maintain uninterrupted service.

It will be apparent from the foregoing description and explanation that the invention provides a simple and effective system for maintaining a vaporizable liquid in an underground evaporating tank, in contact with an area of the tank wall much greater than that which would be covered by the liquid at its natural level, thereby maintaining the pressure of the vapor substantially constant, regardless of the gradual diminution of the supply of the vaporizable liquid. In addition, the provision of heating means in the liquid reservoir makes it possible to effect a certain vaporization of the liquid independently of the heat absorbed from the earth.

Although I have illustrated and described a preferred embodiment of the invention, it will be understood that changes in the construction and arrangement shown may be made without departing from the spirit of the invention or the scope of the appended claims.

I claim:

1. Gas generating apparatus comprising, in combination, a container with its outer surface in heat-exchange contact with the earth, a reservoir for liquid within said container, a connection between the reservoir and the container permitting the passage of liquid from the reservoir but preventing its return, means for withdrawing gas from the container, and heating means within the reservoir adapted to establish a higher temperature and consequently a higher pressure of gas within the reservoir than that of gas in the container.

2. Gas generating apparatus comprising, in combination, a container with its outer surface in heat-exchange contact with the earth, a reservoir for liquid within said container, a connection between the reservoir and the container permitting the passage of liquid from the reservoir but preventing its return, means for withdrawing gas from the container, heating means within the reservoir adapted to establish a higher temperature and consequently a higher pressure of gas within the reservoir than that of gas in the container, and means for applying heat intermittently.

3. Gas generating apparatus comprising, in combination, a container with its outer surface in heat-exchange contact with the earth, a reservoir for liquid within said container, a connection between the reservoir and the container permitting the passage of liquid from the reservoir but preventing its return, means for withdrawing gas from the container, heating means within the reservoir adapted to establish a higher temperature and consequently a higher pressure of gas within the reservoir than that of gas in the container, means for applying heat intermittently, and means for relieving excessive pressure difference between reservoir and container.

4. Apparatus for vaporizing a volatile liquid comprising an evaporating chamber, a liquid reservoir, a connection between the chamber and reservoir, means in the reservoir for heating the liquid therein, and means governed by the level of the liquid in the chamber for controlling said heating means.

5. Apparatus for vaporizing a volatile liquid comprising a container adapted to absorb heat from a surrounding medium and thereby vaporize the volatile liquid contained therein, a reservoir in said container having a connection therewith, heating means in said reservoir adapted to evaporate a portion of the liquid therein, thereby forcing liquid from the reservoir through said connection into said container, and means responsive to the pressure in said container for controlling said heating means.

6. Apparatus for vaporizing a volatile liquid comprising an evaporating chamber, a liquid reservoir, a connection between the chamber and reservoir, means in the reservoir for heating the liquid therein, means governed by the level of the liquid in the chamber for controlling said heating means, and other means responsive to the level of the liquid in the container for relieving excess pressure in said reservoir.

7. Apparatus for vaporizing a volatile liquid comprising an evaporating chamber, a liquid reservoir, means providing communication between said reservoir and said chamber including means for preventing flow of fluid from the chamber to the reservoir, means for heating the reservoir and means responsible to the level of liquid in the chamber for controlling the means for heating the reservoir.

8. Apparatus for supplying gas by vaporizing volatile liquid by absorption of heat from a surrounding medium, comprising a container adapted to be at least partially filled with liquid, a reservoir communicating with said container, means for heating said reservoir in response to a drop in the level of liquid in the container, to force liquid from the reservoir to the container, and means blocking return flow of liquid from the container to the reservoir.

9. In a generator for evaporating gas from its liquid state, an inner reservoir at least partly surrounded by an outer container in heat-exchanging relationship with the earth, means for supplying artificial heat to the inner reservoir to evaporate gas therein, in combination with means for permitting delivery of gas generated in said inner reservoir for outside consumption only when the liquid in the outer container ascends above a predetermined level.

10. Apparatus for supplying gas by vaporizing volatile liquid by absorption of heat from a surrounding medium, comprising a container adapted to be at least partially filled with liquid, a reservoir communicating with said container, means for heating said reservoir in response to a drop in the level of liquid in the container, to force liquid from the reservoir to the container, and means responsive to the level of liquid in the container for relieving excess pressure in the reservoir.

11. Gas generating apparatus comprising an evaporator, a reservoir in said evaporator communicating therewith, a heater in said reservoir, a float switch actuated in accordance with the liquid level in said evaporator for controlling said heater, and a float valve actuated by the liquid level in said evaporator for relieving excess pressure in said reservoir.

12. Gas generating apparatus comprising an evaporator, a reservoir in said evaporator communicating therewith, a heater in said reservoir, a float switch actuated in accordance with the liquid level in said evaporator for controlling said heater, and a check valve between said evaporator and reservoir preventing flow of liquid from the former to the latter.

WILLIAM MAYO VENABLE.